INVENTOR.
JOHN R. THOMAS
BY
Duane C. Bowen
ATTORNEY

INVENTOR.
JOHN R. THOMAS

BY

ATTORNEY

April 1, 1969

J. R. THOMAS 3,435,933

PUMP TYPE HYDRAULIC TRANSMISSION WITH
INTERCHANGEABLE SPOOL VALVES

Filed Nov. 24, 1967

INVENTOR.
JOHN R. THOMAS
BY
*Duane C. Bowles*
ATTORNEY

United States Patent Office 3,435,933
Patented Apr. 1, 1969

3,435,933
PUMP TYPE HYDRAULIC TRANSMISSION WITH INTERCHANGEABLE SPOOL VALVES
John R. Thomas, Wichita, Kans., assignor to The Thomas Company, Inc., Wichita, Kans., a corporation of Kansas
Filed Nov. 24, 1967, Ser. No. 685,612
Int. Cl. F16d 31/04, 31/06, 33/00
U.S. Cl. 192—61
9 Claims

ABSTRACT OF THE DISCLOSURE

In a rotary-housing, hydrostatic, variable-power-transmitting, hydraulic mechanism, valve housings for spool valves, bores in the housings, and air, oil and pump-connecting grooves and ports are configured substantially identically, so that suction and discharge valve spools can be interchanged between bores to adjust the mechanism for direction of rotation of the driving shaft. The configuration of the spools and the bore grooves are related relative to various modes of operation to permit this interchangeability. A casting with a flange acts as a pump manifold and the casting has a pair of bosses diametrically opposed across the driven shaft, the bosses being bored to form the valve housings. The spool stems are directly connected to a shifter collar in the operating mechanism at one end of the rotary housing.

Brief summary of the invention

The invention relates to an improvement in variable-power-transmitting, hydraulic mechanism of the hydrostatic type and preferable of the rotary-housing type. The improvement provides for interchangeability of suction and discharge valve spools in order to adjust the mechanism for the direction of rotation of the driving shaft of the hydraulic mechanism. Other features are chiefly in the nature of simplicity and cost savings and include a single casting providing pump manifold plate and housings for the valve spools.

Background and objectives of the invention

A hydrostatic, variable-power-transmitting hydraulic mechanism requires different connection of suction and discharge control valves depending on which direction the driving shaft to the mechanism rotates. The present invention is particularly pertinent to a rotary housing type of hydraulic mechanism and applies to such mechanisms utilizing spool valves. It will be understood that adjustment for direction of rotation presents a problem in manufacture and distribution, i.e., whether the manufacturer is to provide two different sets of parts relating to suction and discharge and whether he is to ship mechanisms according to clockwise and counterclockwise rotation of driving shaft. If the adaptation according to direction of rotation of driving shaft is to be left to change of parts, completion of assembly, etc., by someone down the distribution line, such as the wholesaler, this still can present a problem in time, trouble, extra parts, the integrity of the assembly, double inventory, etc. About the ultimate solution of this problem appears to be the making of the adjustment at the lower end of the distribution chain by mere change of position of suction and discharge valve spools and it is an object of my invention to provide such capability and to even permit this adjustment to be within the easy capability of parties in the position of ultimate buyers or users.

Other objectives of my invention include minimizing time and expense in making this adjustment, minimizing disassembly or assembly so as to reduce the chance of misassembly (or, in other words, minimizing harm to manufacturing integrity), avoiding manufacture of two sets of parts, and minimizing change for error in adjustment.

Additional objectives of my invention include making other improvements to reduce mechanism complexity, substituting casting for machining when possible, improving mechanism reliability and ease of assembly and maintenance, and reducing costs.

My invention will be best understood, together with additional objectives and advantages thereof, from the following description, read with reference to the drawings, in which.

Detailed description

Figure 1:
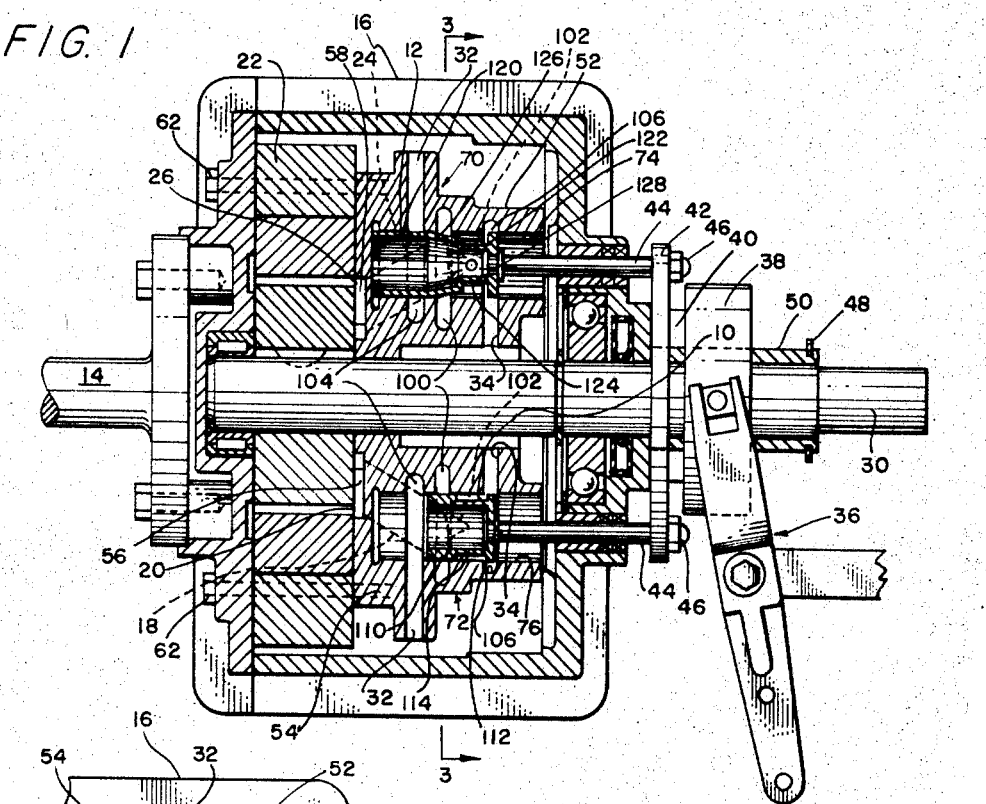
FIGURE 1 is a side view, partly in section of a specific embodiment of my invention, the mechanism being shown in neutral position of valves.

Reference is made particularly to my prior Patents Numbers 3,144,923, 3,150,491 and 3,275,114, and reference is made generally to my other prior patents and to patents to others in the art of variable-power-transmitting, hydrostatic hydraulic mechanisms. These references are made in order to avoid unduly lengthening this description by reciting fundamentals of hydrostatic variable-power-transmitting mechanisms, describing common cycles of operation, or detailing structure not unique to the present invention. I will not detail the structure of the drawings as to rotary housing, fins, shaft connections, seals, bearings, connectors and securing means, pump construction, control means including shifter means external of the interior of the housing, etc., as they are adequately described in the referenced patents and are fully known and readily understood, without further description, by those skilled in the art.

The invention has primary application to rotary housing type mechanisms (where there is the fundamental problem of limited access, difficult control connection, etc., to a rotary housing sealed so as to form an oil reservoir, symmetrically configured, etc.). The invention may be applied to interchange of suction and discharge valve spools in stationary housing mechanisms such as is shown in referenced Patent 3,144,923, as will be understood by those skilled in the art. However, the difficult solution was that of adjusting to different directions of rotation of driving shaft in a rotary housing mechanism wherein the various solutions to basic requirements available in a stationary housing mechanism are not available; wherein a practical solution (without adding hardware, providing complex mechanisms, and like solutions adding substantial cost, complexity, etc.) has to involve disassembly for adjustment or incomplete assembly before adjustment (if manufacturing two different models is to be avoided); wherein it is difficult to provide for adjustment without alternative parts, without considerable complexity, without harm to manufacturing integrity, and without substantial cost increase; and wherein desirable symmetry in a rotatable housing and the difficult axial rotatable control connection greatly resrtict possibilities.

The configuration shown with a suction valve spool 10 in the lower opening in the assembly (as viewed in the drawing) and with a discharge valve spool 12 in the upper opening (as viewed) may be taken as applicable if the direction of rotation of driving shaft 14 is clockwise when viewed from the left end of rotatable housing 16 (see FIGURE 1), suction valve spool 10 connecting through passageway 18 to a suction area 20 of pump 22 and discharge valve spool 12 connecting through passageway 24 to a discharge area 26 of pump 22. If the direction of rotation of driving shaft 14 were, for example, reversed to counterclockwise when viewed from the left end of housing 16 in FIGURE 1, then pump area 20 would become discharge and pump area 26 would become suction. According to my invention, this change of direction of rotation is accommodated by moving suction valve spool 10 to the upper position (in the housing radial position viewed in the drawing) and by moving discharge valve spool 12 to the lower position (as viewed), passageway 24 then becoming a suction passageway and passageway 18 then becoming a discharge passageway. Of course, it is only by specially and purposefully designed configuration of lands, grooves and ports of the spools and the bores receiving the spools that this effective interchange of spools is able to adjust the mechanism for direction of rotation of driving shaft 14.

Figure 2:
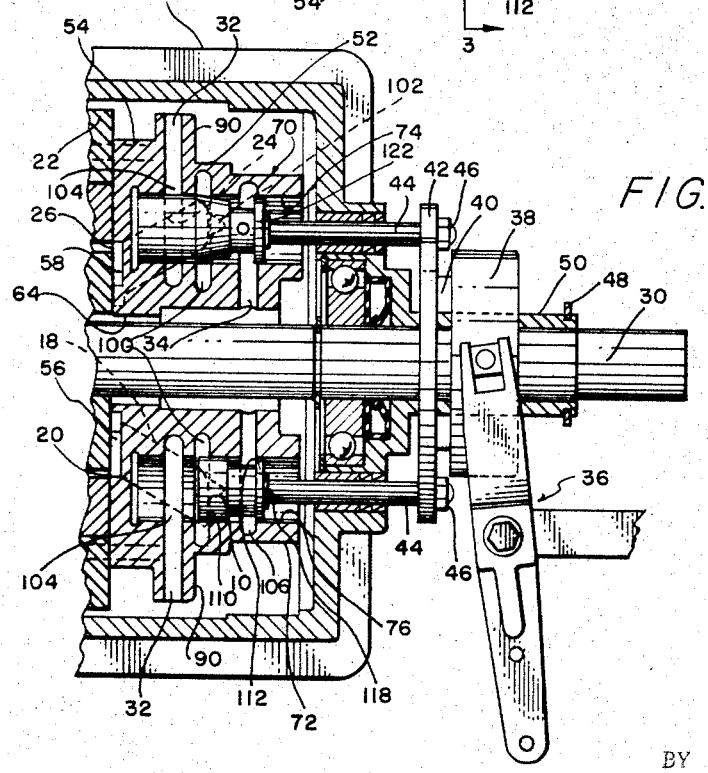
FIGURES 2 and 4 are similar to FIGURE 1, except for omitting certain structure on the left hand side as viewed, FIGURE 2 showing the mechanism in partly engaged position of valves, and FIGURE 4 showing the mechanism in fully engaged position of valves.
Figure 3:
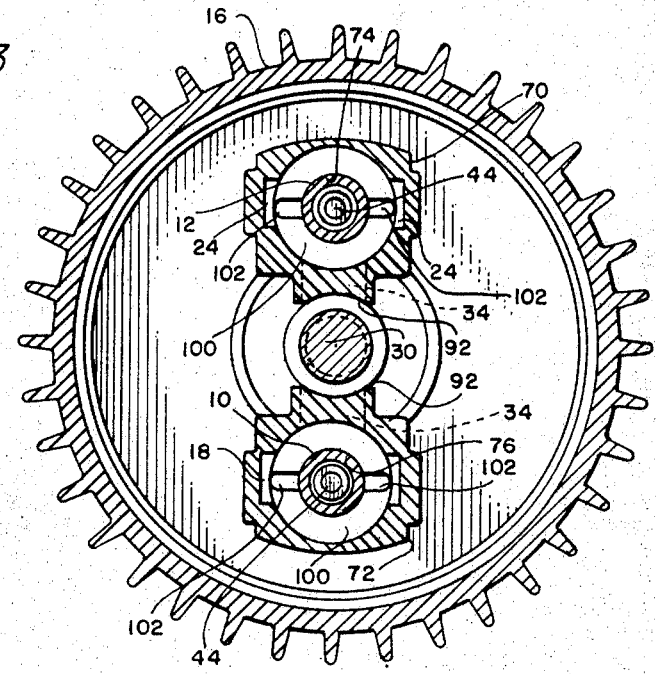
FIGURE 3 is a sectional view taken on line 3—3 of FIGURE 1.
Figure 4:
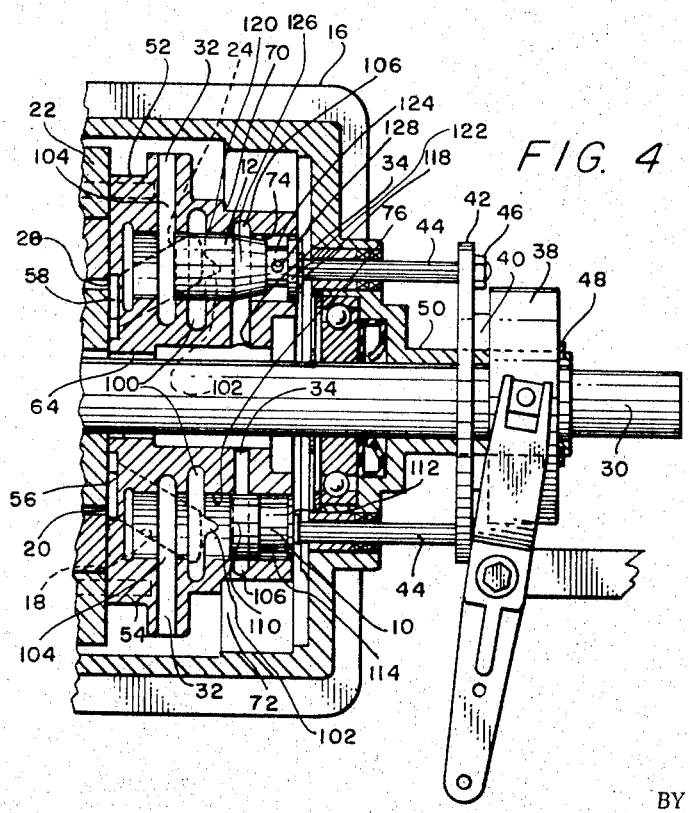
Figure 5:
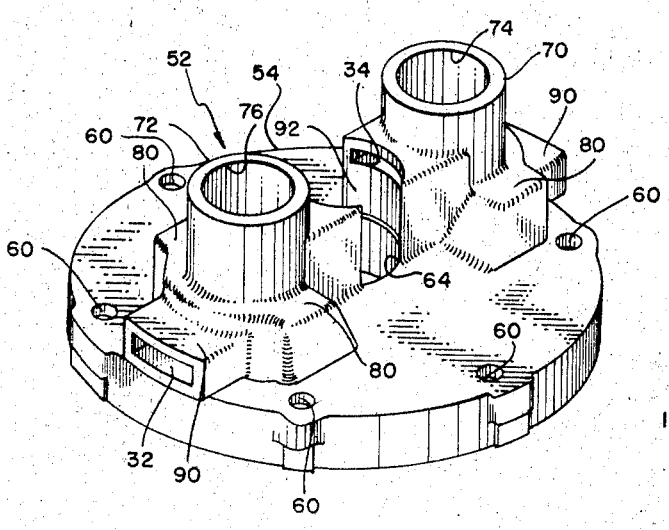
FIGURE 5 is a view in perspective of one side of a casting forming a manifold plate and valve housings in the assembly.
Figure 7:
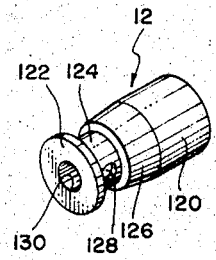
FIGURE 7 is a perspective view of the discharge valve spool and FIGURE 8 is a perspective view of the suction valve spool used in the assembly.
Figure 8:
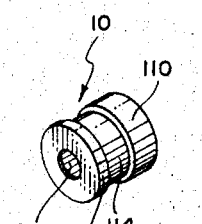
Figure 6:
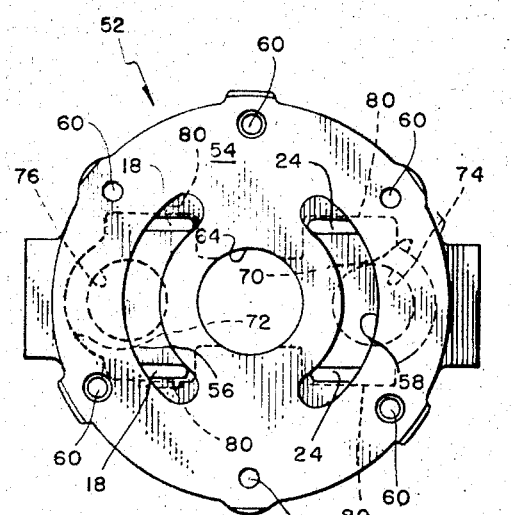
FIGURE 6 is a face view of the opposite side of the casting of FIGURE 5.
Figure 9:
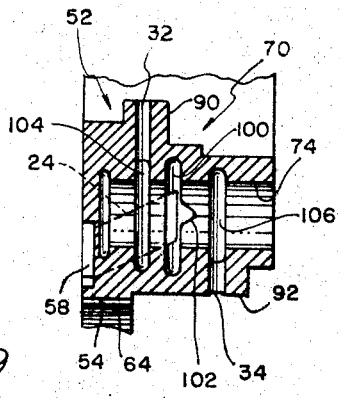
FIGURE 9 is a fragmentary, sectional view showing the interior of one of the valve housing bores, the view being similar to the showing in the upper portion of FIGURES 1, 2, and 4, but in this view the valve spool is omitted to permit the bore to be viewed without obstruction.

It will be understood without detailed description that (1) driven shaft 30 is not rotated by driving shaft 14, rotates at only a variable part of the speed of driving shaft 14, or drives practically in unison with driving shaft 14 depending on whether suction and discharge valve spools 10, 12 admit only air, various mixtures of air and oil, or only oil to pump 22, and whether discharge from pump 22, is free, partly choked or fully choked, (2) rotatable housing 16 contains oil which forms an annular zone of oil during rotation and which leaves an inner zone of air (rotatable housing 16 being filled with sufficient oil to feed oil ports 32 but of an insufficient amount to cover air ports 34—preferably the line of division between oil and air is a radius slightly larger than the radius to the ends of air ports 34), (3) although the description and claims are in terms of air and oil, other fluids of different resistant values could be used as is explained in the prior cited patents, but as a practical matter there would be few if any applications where other than air and oil would be used, (4) pump 22 may be one of a number of positive displacement pumps, although a gerotor type pump is illustrated, as explained in the prior cited patents, (5) the shaft connections, seals and bearings, the construction and securing of parts of housing 16, etc., will be understood by those skilled in the art from the drawings and are explained in the prior cited patents, and (6) the externally operable control means will be understood from the drawings and are explained in the prior cited patents and, briefly, include (a) shifter yoke 36, (b) a collar assembly including an outer non-rotatable part 38 and an inner rotatable part 40 connected togehter by anti-frictional bearing means for relative rotation but to move together longitudinally of driven shaft 30, (c) a shifter plate or ring 42 (secured to or forming a part of inner rotatable part 40) to which valve spool stems 44 are directly connected by suitable means such as including nuts 46 (housing 16 having suitable sealing or packing means to pass and seal stems 44), (d) a snap ring 48 on sleeve 50 forms an outer stop for the shifter means, and (e) external control movement input through yoke 36 moves suction and discharge valve spools 10, 12 from the neutral position of FIGURE 1 feeding only air to pump 22 (in which driven shaft 30 does not rotate) through various selected intermediate partly engaged positions such as that shown in FIGURE 2 in which mixtures of air and oil are fed to pump 22 (in which partial power is transmitted from driving shaft 14 to driven shaft 30), to the fully engaged position of FIGURE 4 in which only oil is fed to pump 22 and discharge is substantially blocked (so that driven shaft 30 and driving shaft 14 rotate substantially in unison).

One major item of simplicity and cost saving is the provision of a casting 52 having a flange 54 which acts as a manifold plate for pump 22. Passageways 18, 24, respectively communicate with arcuate grooves or wells 56, 58 which abut and communicate with the suction area 20 of pump 22 and the discharge area 26 of pump 22 respectively. Threaded openings 60 in flange 54 are used to secure casting 52 in place by bolts 62. A central opening 64 in casting 52 accommodates driven shaft 30. A pair of bosses 70, 72 on the opposite side of casting 52 from pump 22, form valve housings and have bores 74, 76, respectively, receiving discharge valve spool 12 and suction valve spool 10, respectively. Bosses 70, 72 each have a pair of shoulders 80 which provide extra room to accommodate the cast passageways 18, 24. Casting radial extensions 90 are provided for purposes of forming the cast oil ports 32. It will be understood from examination of the prior art that I have eliminated various parts and have substituted a casting for much in the way of machined parts by devising casting 52. Usually manifold plates and valve housings are separate and machined, etc. I have endeavored to make about maximum use of cast exterior surfaces and passageways and in the present model the machined surfaces and openings are principally the bores 74 and 76 (enlarging and smoothing cast openings), shaft opening 64 (enlarging and smoothing), surfaces 92 of bosses 70, 72 facing driven shaft 30, the ends of casting radial extensions 90, the ends of bosses 70, 22, the face of the casting abutting pump 22, and a few other minor places. Note that part of this machining is minor and may be no more than minimal surface smoothing. Some of the cast parts include arcuate grooves or wells 56, 58, passages and ports 18, 24, 32, 34, the annular grooves in the bores which have not been specifically described yet, most of the periphery of flange 54, and most of the surface of the casting opposite pump 22. The cost savings in these cast features are, of course, significant.

I will now review the configuration of spools 10, 12 and the associated bores 76, 74 which achieve control of pump operation and yet permit interchange in order to adjust for drive shaft direction of rotation. Each bore 74 has an annular intermediate pump connecting groove 100 which communicates with passageways 18, 24 to pump 22. Grooves 100 each have a tear-drop shaped (or tapered) slot 102 extending part way toward the open end of the bore 74, 76. Oil port 32 leads to an annular oil groove 104 in bores 74, 76, and air port 34 leads to an annular air groove 106 in bores 74, 76. The bores 74, 76 and the ports, passageways and grooves associated therewith are identical in sizes, location, configurations, etc. (except that ports 32, 34 have different or opposite radial direction) so that suction and discharge valve spools 10, 12 function the same whichever bore they are positioned.

Suction valve spool 10 has a broad inner land 110, a narrow outer land 112 and a broad annular groove 114 therebetween. Spool 10 is hollow, has its inner end open, and has an end opening 116 in which the associated valve stem 44 is secured in some suitable manner, such as by a weld to a flange 118 on stem 44. Discharge valve spool 12 has a broad inner land 120, a narrow outer land 122, an annular groove 124 therebetween, a portion 126 tapered from inner land 120 in a direction toward groove 124, a hollow interior, an open inner end, a pair of openings 128 through the spool body in the area of groove 124, and an end opening 130 in which the associated valve stem 44 is secured, as by a weld to a stem flange 118.

I will associate a description of the relationships of spool and bore grooves, lands, ports, etc., with a description of operation. FIGURE 1 illustrates the neutral or idler operation in which only air is fed to pump 22 and driven shaft 30 has substantially no movement although driving shaft 14 and housing 16 are rotating (and oil in housing 16 forms an annular, outer zone configuration leaving an inner zone, core of air). Air is fed through air port 34 associated with suction valve spool 10, through air annular groove 106, past narrower land 112 of spool 10 (which is positioned to permit communication between grooves 106, 100, 112) to intermediate groove 100 via tear-drop slot 102 and spool groove 114, through passageways 18, to well 56, to suction area 20 of pump 22, and out of pump 22 via discharge area 26, through well 58, via passageways 24, to the bore associated with discharge spool valve 12 to intermediate groove 100, past tapered position 126, groove 124, and end land 122 of discharge spool 12, through air annular grove 106, and out air port 34. Oil inlet from oil port 32 and oil groove 104 is prevented by land 110 of suction valve spool 10.

Referring to the FIGURE 2 partly engaged position (one of various positions intermediate FIGURE 1 and FIGURE 4 positions), it will be noted that suction valve spool 10 has moved past positions (from the FIGURE 1 position) metering decreased amounts of air as inner land 110 of suction spool 10 has gradually passed the main portion of intermediate groove 100 and the tapered, tear-drop slot extension 102, so that in the FIGURE 2 position substantially all air is blocked from passing via air port 34 and air groove 106 to groove 100 and slot 102. In the same progression of movements from FIGURE 1 to FIGURE 2, inner land 110 of suction spool 10 has gradually opened up communication of oil via port 32 and oil groove 104 to intermediative groove 100, thereby metering varying proportions of air and oil via passageways 18 and well 56 to the suction area 20 of pump 22. Discharge from pump 22 is from discharge area 26, through well 58, via passageways 24, to intermediate groove 100 (on the discharge side), past tapered portion 126 of discharge spool 12 (and partly through tear-drop slot 102 from intermediate groove 100 which will progressively meter decreasing discharge as discharge spool 12 moves outwardly, to the right as viewed, from the FIGURE 2 position), and out of the discharge bore via air groove 106 and air port 34. Note that oil groove 104 and oil port 32 are not used for oil discharge on the discharge side of the system, groove 104 and port 32 serving their functions on the suction side and not being needed on the discharge side (and, hence, appearing in both bores only for the purpose of valve spool interchange). Port 32 and oil groove 32 do permit outlet of oil trapped in the discharge bore during initial movement of the discharge spool from FIGURE 4 to FIGURE 1 positions, but as dash potting is later relieved by discharge spool openings 128 the use of port 32 is not required. As increasing amounts of oil and decreasing amounts of air are brought in through suction, and as discharge starts to choke, in the FIGURE 1 to FIGURE 2 transition, the relatively moving parts (gears) of pump 22 become less free to relatively move and driven shaft 30 is transferred increasing power from driving shaft 14. Of course the movement of suction and discharge spools from FIGURE 1, to FIGURE 2, to FIGURE 4 positions is accomplished through external control exercised though yoke 36, shifter parts 38, 40, 42, and via spool stems 44 which move in unison in moving the spools for increased or decreased engagement of the hydraulic power transmitting mechanism. Note that if the discharge spool 12 were moved from FIGURE 4 to FIGURE 1 position, some oil could be trapped in the bottom of the dischrge bore, and a dash pot type effect is avoided by permitting oil to escape through the open inner end and the hollow interior of discharge valve spool 12, and out through two diametrically opposite openings 128 in discharge spool 12 (in the area of groove 124) and out through air groove 106 and air port 34.

Referring now to the FIGURE 4 fully engaged position, air inlet on the suction side is blocked by inner land 110 of suction spool 10 but oil has completely unrestricted entry through oil port 32, oil groove 104 and the bore to intermediate, pump connecting groove 100, via passageways 18, through well 56, to the suction area 20 of pump 22. Discharge from pump 22 is substantially completely blocked or choked as the inner broad land 120 of discharge valve 12 has closed outlet from intermediate, pump-connecting groove 100 and its tapered extension 102 (tapered portion 126 of discharge spool 12 having moved to the right of the end of tear-drop slot extension 102—which in stages between FIGURE 2 and FIGURE 4 positions coacted in their tapers to gradually completely choke discharge). In the FIGURE 4 position, thus, with only oil fed (freely) to pump 22 and with discharge substantially completely blocked, the relatively moving parts (gears) within pump 22 are substantially locked so that substantially complete power is transferred from driving shaft 14 to driven shaft 30.

The reverse operation, from FIGURE 4 to FIGURE 1 positions (from fully choked to neutral positions), will be obvious from the above. The operation also would appear to be clear if driving shaft 14 were reversed in direction and the discharge spool 12 were put in the lower bore 74 as viewed and the suction spool 10 were put in the upper bore, because the bores and associated grooves, lands and ports have the same configuration relative to a direction parallel to the axis of rotation of pump 22 (the differences being only in opposite radial directions of porting).

Note that outer lands 112, 122 of spools 10, 12 respectively do not have valving or control functions and instead merely act as guides to assist in maintaining proper alignment of the spools. One of the simplicities and cost savings in the construction shown is the direct connection of valve spool stems 44 to a shifter ring or flange 42 external of rotating housing 16, as in the prior art the constructions known involve two or more parts intermediate valve and shifter ring external of a rotating housing. This direct connection also avoids slack motion found in prior interfitting parts in valve-shifter ring connections. The direct connection of valve stems 44 to shifter ring 42 does require outer stop 48 as the stop function is not accomplished in the interior of the housing. Note that although in the FIGURE 1 position, air inlet is not fully open (air groove 106 is not fully open and communication to intermediate, pump connecting groove 100 is through tear-drop slot 102, this is not material because the pump does not require a great inflow of air and air will feed at considerable rate even through some restriction under any suction pressure.

The nature of my invention and the details and operation thereof appear to have been fully covered in the above. I do not wish to be understood as limiting myself to the precise details of construction shown, but instead wish to cover the modifications thereof which will be understood by those skilled in the art after learning of my invention and which properly come within the scope of my invention.

I claim:

1. In hydraulic apparatus variably transmitting power from a rotary driving member to a rotary driven member by pump means having relatively moving parts connected to said two rotary members, a source of oil and a source of air, suction spool valve means and discharge valve means connected to said pump means and operable to control supply and discharge of air and/or oil between said pump means and said sources of oil and air, and control means connected with said valve means to operate the same, the improvement, comprising:

(a) valve housing means having two bores receiving said spool valves, said spool valves being differently configured to perform their different valving functions but having identical maximum diameters, said valve housing means having lands, grooves and ports in each bore being identically located relative to a direction parallel to the axis of said pump means, and said lands having the same sized diameters in the two bores, and whereby said spool valves may be operated the same by said control means whichever bore contains which spool valve.

(b) said pump means having suction-discharge areas and means forming passageway means between each bore and one of said suction-discharge areas of said pump means, whereby the hydraulic apparatus may be adjusted to the direction of rotation of said relatively moving parts of said pump means by selection of which spool valve is positioned in which bore.

2. The subject matter of claim 1 in which said hydraulic apparatus includes a rotary housing containing said pump means, said source of oil being oil received in said rotary housing and forming therein an annular zone of oil when said rotary housing is rotated and said source of air being the inner zone of air within said annular zone of oil.

3. The subject matter of claim 2 in which said valve housing means have an oil port extending outwardly radially of said rotary housing from each bore and into said annular zone of oil, and each bore having an annular oil groove at the location of said oil port, and said valve housing means have an air port extending inwardly radially of said rotary housing from each bore and into said inner zone of air and each bore having an annular air groove at the location of said air port, and said valve housing means having an intermediate groove in each bore between said oil groove and said air groove, and said means forming passageways between each bore and one of the discharge-suction areas of said pump means communicating with said intermediate groove, the lands between and at the ends of said grooves in said bores all having identical diameters and the grooves and ports being identical between the two bores except for the different radial directions of porting and said spool valves having lands of nearly the same diameter as said lands between and at the ends of said grooves.

4. The subject matter of claim 3 in which said suction spool valve has a single groove between an inner land at the inner end of the suction spool valve relative to the bores and an outer land and said inner and outer lands are located so that when said control means moves said suction spool valve to inner, neutral position said single groove is aligned with said annular air groove sufficiently to receive air from said inner zone of air, said intermediate grooves in said bores having tear-drop shaped slots extending part way towards said air grooves whereby said single groove of said suction spool valve in said inner neutral position communicates with the associated teardrop shaped slot and air is thus fed to pump through the intermediate groove and associated passageway, said inner land of said suction spool valve being located so that when said control means moves said suction spool valve from said inner, neutral position said inner land moves from a position blocking flow of oil from the oil groove to the intermediate groove of the associated bore to positions permitting increasing amounts of oil to enter the pump, and said inner land of said suction spool valve being located so that when said control means moves said suction spool valve to outer fulllly engaged position said inner land moves to a position blocking flow of air from the air groove to the associated intermediate groove and tear-drop shaped slot, whereby said suction valve is moved by said control means from a neutral position feeding all air to said pump means through partly engaged positions feeding variable mixtures of air and oil to a fully engaged position feeding all oil.

5. The subject matter of claim 3 in which said discharge spool valve has a single groove between an inner land at the inner end of the discharge spool valve relative to the bores and an outer land; and there being a tapered portion of said discharge spool valve tapering from said inner land to said single groove, and said discharge spool being hollow and having its inner end open and there being opening means through the discharge spool valve to the hollow interior in the area of said single groove whereby as said discharge spool valve moves from outer to inner position relative to the associated bore a dash-pot effect is avoided by permitting oil in the bore to discharge out through the open inner end, hollow interior and opening means of said discharge spool valve, said tapered portion of said discharge spool valve being located so that when said control means moves said discharge spool valve to inner, neutral position the tapered portion permits passage of discharge out of said intermediate groove from said pump means, said intermediate grooves in said bores having tear-drop shaped slots extending part way towards said air grooves, said tapered portion of said discharge spool valve being located so that when said control means moves said discharge spool valve from inner, neutral position said tapered portion starts to close the associated intermediate groove and tear-drop shaped slot for choking discharge until in outer fully engaged position said inner land completely closes the associated intermediate groove and teardrop shaped slot thereby completely blocking discharge from said pump means, whereby said discharge spool valve is moved by said control means from a neutral position permitting free pump discharge to positions finally completely choking pump discharge.

6. The subject matter of claim 2 in which there is a casting having a flange forming a manifold plate abutting said pump means and in which said casting has on its opposite side from said pump means a pair of diametrically opposed bosses forming said valve housing means, each boss having one of said bores, and said means forming passageway means between each bore and one of said suction-discharge areas of said pump means are passages through said casting from said bores in said bosses to the side of said casting abutting said pump means.

7. The subject matter of claim 6 in which there are dual passages in each boss from opposite sides of the bore in each boss and said casting on its side abutting said pump means having a pair of arcuate recesses and said dual passages associated with each boss communicating with the end portions of one of said arcuate recesses and each arcuate recess generally aligning with one of the suction-discharge areas of said pump means, and each boss having a pair of shoulders providing room for said dual passages.

8. The subject matter of claim 6 in which each bore has an annular oil groove and the associated boss has a passageway radially outward from said oil groove into said annular zone of oil, and in which each bore has an annular air groove and the associated boss has a passageway radially inward from said air groove into said inner zone of air, and in which each bore has an annular groove communicating with said passages through said casting, and in which said casting has a central bore to pass one of said rotary members connected with the relatively moving parts of said pump means.

9. The subject matter of claim 2 in which said control means includes an annular shifter plate external of said rotary housing and in which each spool valve has a valve stem secured directly to said shifter plate.

References Cited

UNITED STATES PATENTS

| | | | |
|---|---|---|---|
| 1,270,424 | 6/1918 | Lochridge | 137—271 |
| 2,247,141 | 6/1941 | Twyman | 137—271 XR |
| 2,839,889 | 6/1958 | McGill | 192—61 XR |
| 3,275,114 | 9/1966 | Thomas | 192—61 |

CARLTON R. CROYLE, *Primary Examiner.*

ALLAN D. HERRMANN, *Assistant Examiner.*

U.S. Cl. X.R.

60—53; 91—54; 137—271